(12) United States Patent
Duxbury (10) Patent No.: US 6,289,063 B1
(45) Date of Patent: Sep. 11, 2001

(54) QAM RECEIVER WITH IMPROVED IMMUNITY TO CROSSTALK NOISE

(75) Inventor: Guy M. A. F. Duxbury, Nepean (CA)

(73) Assignee: Nortel Networks Limited, St-Laurent (CA)

( * ) Notice: Subject to any disclaimer, the term of this patent is extended or adjusted under 35 U.S.C. 154(b) by 0 days.

(21) Appl. No.: 09/146,341

(22) Filed: Sep. 2, 1998

(51) Int. Cl.⁷ .............................. H04B 1/10; H04B 1/00; H04L 25/08; H03K 5/159

(52) U.S. Cl. .................... 375/348; 375/350; 375/229; 375/232; 375/233; 375/332; 375/261; 329/309

(58) Field of Search ..................... 375/346, 348, 375/350, 229, 230, 231, 232, 233, 235, 261, 332, 329, 322, 279, 280, 281; 333/28 R, 18; 455/307, 63, 295, 296, 67.3, 501; 708/300, 322, 323; 329/304; 370/206, 201, 286, 290, 291

(56) References Cited

U.S. PATENT DOCUMENTS 4,870,657 * 9/1989 Bergmans et al. .................. 375/233
5,276,711 * 1/1994 Rossi ..................................... 375/348
5,581,585 * 12/1996 Takatori et al. ...................... 375/376

* cited by examiner

Primary Examiner—Stephen Chin
Assistant Examiner—Betsy L. Deppe (57) ABSTRACT

The invention discloses a novel equalization system for reducing the deleterious effects of crosstalk on signals received at a modem, with particular regard to QAM signals transmitted over copper twisted pairs. The equalization system employs the common combination of a linear equalizer followed by a decision-feedback equalizer (DFE). However, instead of aiming for perfect equalization of channel distortion, the overall frequency response of the channel plus the linear equalizer is skewed such that higher frequencies are attenuated relative to lower ones. More generally, the spectral regions where crosstalk is strongest are attenuated, which reduces the crosstalk noise present at the input to the DFE at the expense of introducing inter-symbol interference (ISI). Fortunately, most DFEs are capable of handling the added ISI, leading to data decisions that are relatively unaffected by crosstalk noise.

20 Claims, 4 Drawing Sheets

QAM RECEIVER WITH IMPROVED IMMUNITY TO CROSSTALK NOISE

FIELD OF THE INVENTION

The present invention is concerned with the reception of electronic signals and particularly relates to a method and apparatus for reducing the effects of crosstalk on received subscriber loop signals.

BACKGROUND OF THE INVENTION

A signal travelling along an unshielded copper twisted pair undergoes frequency-dependent attenuation due to the transmission characteristics of the cable. This distortion can be modelled as a slowly time-varying filtering operation applied to the transmitted signal. The relative variations in the attenuation at different frequencies cause phase shifts in the transmitted waveform and, in digital transmission systems, ultimately lead to spreading of the transmitted symbols into adjacent symbol intervals, a phenomenon known as inter-symbol interference (ISI). This results in the receiver committing errors when data decisions are made based on the distorted received signal.

In order to compensate for the distortive effects of cable loss, it is customary to employ a linear equalizer, possibly even an adaptive one, followed by a decision-feedback equalizer (DFE). The linear equalizer usually consists of a filter, either digital or analog, which has a frequency response equal to (or close to) the inverse response of the twisted pair "channel". Therefore, if the transmitted signal is attenuated by a downwards sloping frequency response as it travels along the twisted pair, then the frequency response of the linear equalizer will have an upwards sloping shape.

The purpose of linear equalization is to equalize, or "flatten", the overall channel response affecting the transmitted signal as it arrives at the decision-feedback equalizer. This linear equalization process has the effect of removing much, but not all, of the ISI corrupting the transmitted signal. The DFE is then used for removing any remaining ISI and for making data decisions on the received digital signal. Much theory has been developed around the problems of channel equalization and decision-feedback equalization, and various implementations have proven successful in the case of a digital signal transmitted along isolated media.

However, when a telephone company considers delivering digital signals to a plurality of subscribers over a copper twisted pair infrastructure, it is often the case that multiple twisted pairs are bundled together for at least part of the journey between a central office and the subscribers. As a result of poor shielding provided by the thin layer of insulant surrounding each copper wire, electromagnetic fields may be induced by one wire into other wires in the bundle, creating an effect known as crosstalk.

In general, crosstalk couples more at higher frequencies and therefore after a long voyage along a twisted pair, the effect of crosstalk on a transmitted signal will be most noticeable at high frequencies. A serious problem then occurs if the linear equalizer in the receiver boosts the high frequencies in an attempt to equalize the channel: the effects of crosstalk noise, which is stronger at higher frequencies, are actually enhanced.

At the DFE, therefore, the received signal equalized in accordance with prior art techniques has reduced ISI but possibly increased crosstalk noise. When crosstalk noise becomes the dominant cause of distortion, as when many twisted pairs are bundled together, the decision-feedback equalizer is incapable of making correct data decisions, with obvious deleterious consequences.

SUMMARY OF THE INVENTION

It is an object of the present invention to mitigate or obviate one or more disadvantages of the prior art.

Therefore, the invention may be summarized according to a first broad aspect as an equalization system for equalizing an input signal corrupted by inter-symbol interference and crosstalk noise, the equalization system comprising: a linear equalizer for filtering the input signal and producing an intermediate signal having reduced crosstalk noise and reduced inter-symbol interference; and a decision-feedback equalizer connected to the linear equalizer, for filtering the intermediate signal and further reducing the inter-symbol interference contained therein.

According to a second broad aspect, the invention may be summarized as an equalization system for producing an output data signal from an input signal corrupted by channel distortion and crosstalk noise, the crosstalk noise having a frequency characteristic, the channel distortion causing inter-symbol interference, the equalization system comprising: an adaptive linear equalizer for filtering the input signal and producing an intermediate signal having reduced crosstalk noise and reduced inter-symbol interference, wherein the adaptive linear equalizer has a frequency response controllable by a first error signal; a decision-feedback equalizer connected to the adaptive linear equalizer, for filtering the intermediate signal and further reducing the inter-symbol interference contained therein, thereby to produce the output data signal; an offset filter connected to the adaptive linear equalizer, for filtering the intermediate signal in accordance with a selectable offset frequency response and producing an offset-filtered signal, wherein the offset frequency response is selected to resemble the crosstalk frequency characteristic; and an error calculation block connected to the decision-feedback equalizer, to the offset filter and to the adaptive linear equalizer, for measuring a characteristic of the difference between the offset-filtered signal and a delayed version of the output data signal, thereby to produce the first error signal.

The invention may be summarized according to a third broad aspect as a method of equalizing an input signal corrupted by inter-symbol interference and crosstalk noise, comprising the steps of: filtering the input signal with a linear equalizer, thereby to produce an intermediate signal having reduced crosstalk noise and reduced inter-symbol interference; and filtering the intermediate signal with a decision-feedback equalizer, thereby to further reduce the inter-symbol interference in the intermediate signal.

In a method of equalizing an input signal corrupted by inter-symbol interference caused by cable loss varying in the frequency domain, said method consisting of filtering the input signal with a linear equalizer having a frequency response which compensates for the inter-symbol interference, the invention may be summarized according to another broad aspect as the improvement wherein the frequency response of the linear equalizer is deliberately made different from the frequency response which fully compensates for the inter-symbol interference so as to compensate for crosstalk, the remaining inter-symbol interference being further reduced by filtering with a decision-feedback equalizer.

According to yet another broad aspect, the invention may be summarized as a receiver used for producing a plurality of streams of digital data from a received analog input signal containing an analog message signal carrying the digital data, the message signal being centered about a carrier frequency and corrupted by channel distortion and crosstalk noise having respective frequency characteristics, the channel distortion causing inter-symbol interference, the receiver comprising: a bandpass filter for receiving the analog input signal and extracting the analog message signal therefrom; an analog-to-digital converter connected to the bandpass filter for converting the analog message signal to an intermediate digital signal; a demodulator connected to the analog-to-digital converter for creating a plurality of digital output signals from the intermediate digital signal; at least one decision-feedback equalizer connected to the demodulator for filtering the digital output signals and creating the digital data streams therefrom; and adaptive equalization means placed at one or more points between the bandpass filter and the decision-feedback equalizer, the equalization means having a selectable overall frequency response; wherein the overall frequency response of the equalization means is selected to resemble the difference between the inverse of the frequency characteristic of the channel distortion and the frequency characteristic of the crosstalk noise.

BRIEF DESCRIPTION OF THE DRAWINGS

The preferred embodiment of the present invention will now be described with reference to the following figures, in which.

DETAILED DESCRIPTION OF THE PREFERRED EMBODIMENT

Figure 1:
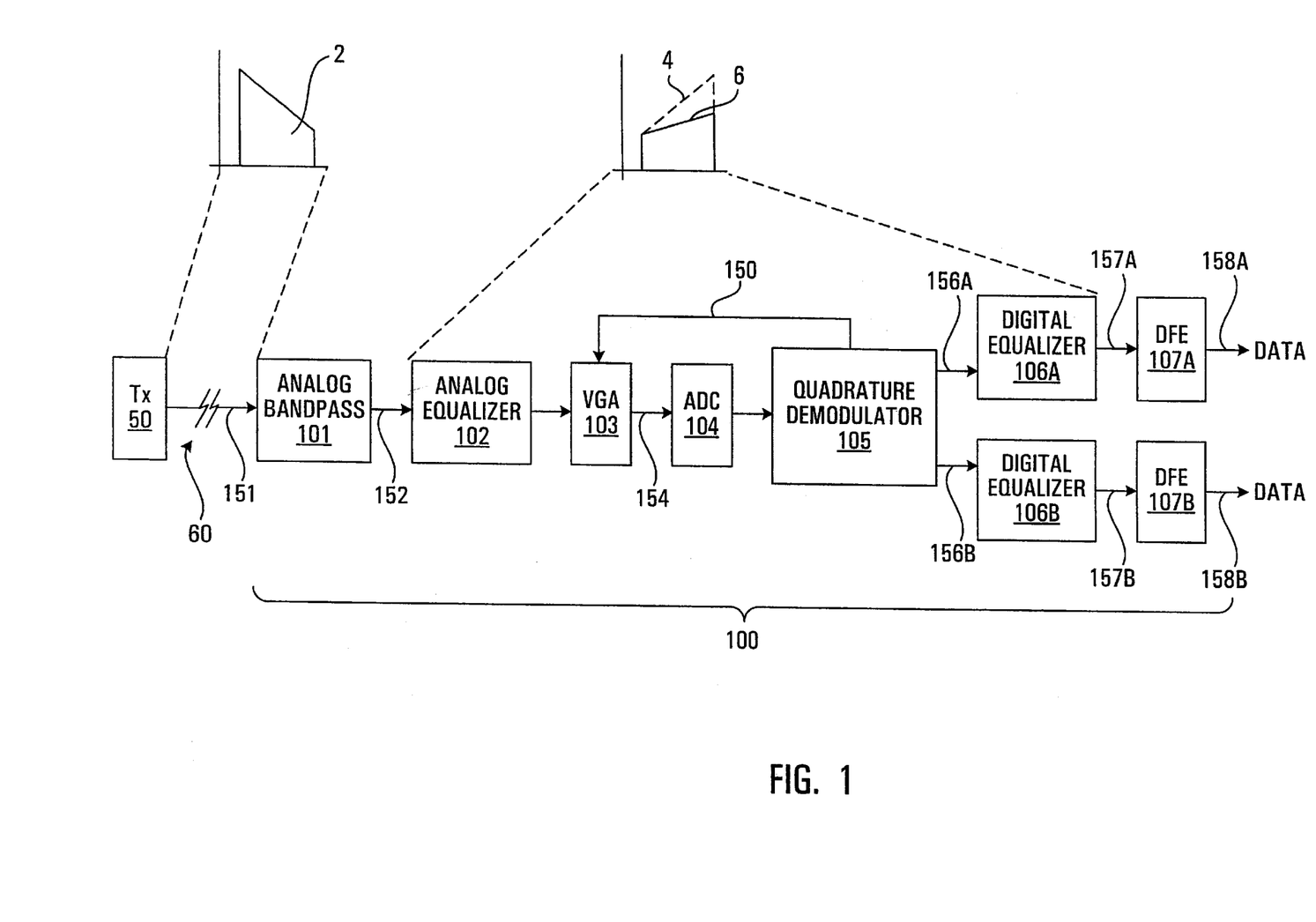
FIG. 1 is a high-level block diagram of a transmission system and particularly a receiver in accordance with the preferred embodiment of the present invention.

With reference to FIG. 1, there is shown a transmitter 50 for transmitting an analog version of a digital signal across a channel 60 to an inventive receiver 100. The receiver 100 would typically form part of a modem at customer premises equipment or at a network unit interfacing with twisted pairs leading to individual subscribers.

At the receiver 100, a received analog signal 151 enters an analog bandpass filter 101, an analog equalizer 102, a variable gain amplifier (VGA, 103) and an analog-to-digital converter (ADC, 104) prior to entering a demodulator 105. The VGA 103 is controlled by a control signal 150 from the demodulator 105 and produces a level-controlled signal 154 leading to the ADC 104.

The demodulator 105 is preferably a quadrature demodulator and produces two baseband digital signals, namely, an in-phase signal 156A and an in-quadrature signal 156B, which are fed to respective identical (linear) digital equalizers 106A,B. The demodulator 105 contains an automatic gain control (AGC) function which controls the VGA 103 via control signal 150 that varies in accordance with the difference between an estimate of the combined power of the baseband digital signals 156A,B and a desired value.

The two baseband digital signals 156A,B follow parallel paths through respective digital equalizers 106A,B and decision-feedback equalizers (DFEs) 107A,B. In the embodiment of FIG. 1, the digital equalizers 106A,B are fixed digital filters and could be finite impulse response (FIR) filters (as is preferred) or infinite impulse response (IIR) filters, producing respective equalized digital signals 157A,B. The DFEs 107A,B strive to eliminate inter-symbol interference present in the equalized digital signals 157A,B exiting the digital equalizers 106A,B, producing respective data streams 158A,B that are used by additional customer premises or telco components connected to the receiver, such as buffers, computer memories and the like.

While the receiver 100 in FIG. 1 appears to resemble a prior art receiver, there has been a significant modification to the composite frequency response provided by the analog equalizer 102 and digital equalizers 106A,B. Assuming that the channel is afflicted with a frequency response 2 having a particular slope, a prior art receiver would apply a composite analog and digital frequency response 4 having a slope that is inversely proportional to the slope of the channel frequency response 2.

In the preferred embodiment of the present invention, however, the digital equalizers 106A,B (at baseband) and the analog equalizer 102 (at passband) apply a composite frequency response 6 which is similar to the prior art frequency response 4 but is milder in slope, i.e., the inventive receiver has a composite frequency response which deviates from the "ideal" channel equalization response by providing higher attenuation at higher frequencies. The offset frequency response, defined as the difference between the "ideal" response 4 and the inventive response 6, desirably rises by 1 to 20 decibels across the spectral region of interest, which ranges between 1 MHz and 30 MHz in the case of QAM transmission over copper twisted pairs.

In operation, the received analog signal 151 is an analog version of a digitally modulated signal, preferably a quadrature amplitude modulation (QAM) signal of order 4, 16, 64 or 256, having side lobes centered about a carrier frequency in the range of 1 MHz to 30 MHz. While these limits represent the most practical operational range for local loop transmission systems, it is within the scope of the present invention to use any order of QAM or in fact any other digital modulation scheme in any frequency range. For example, the present invention is also applicable to systems using carrierless amplitude and phase (CAP) modulation in the 1–30 MHz frequency range.

The analog bandpass filter 101 selects only those portions of the frequency spectrum of the received analog signal 151 which are of interest, i.e., the spectral region surrounding the carrier frequency. The analog equalizer 102 then performs another filtering operation on signal 152 exiting the analog bandpass filter 101. The frequency response of the analog equalizer 102 is matched to partially compensate for losses due to the twisted pair cable that can be easily estimated or are known in advance.

The gain of the level-controlled signal 154 output by the VGA 103 is adjusted according to the power (or energy or magnitude) level of the baseband digital signals 156A,B as demodulated by the quadrature demodulator 105. This ensures that a relatively constant signal gain is maintained at the input to the ADC 104. The quadrature demodulator 105 is a component commonly used in the art for producing the in-phase and in-quadrature baseband demodulated signals 156A,B from the (quadrature modulated) level-controlled signal 154.

The operations performed by digital equalizer 106A and DFE 107A are identical to those performed by digital equalizer 106B and DFE 107B, and thus it is sufficient to continue describing the invention with reference only to the "B" phase involving digital equalizer 106B and DFE 107B.

Digital equalizer 106B partially compensates for cable loss and has a frequency response (at baseband in the digital domain) which, in combination with the frequency response (at passband in the analog domain) of the analog equalizer 102, approximates the inverse channel response of the copper twisted pair offset by a mild decay, as represented by frequency response 6. This effectively attenuates higher frequencies relative to lower ones, and therefore reduces the effect of crosstalk noise, which is known to be predominant at higher frequencies.

However, applying a frequency response such as frequency response 6 instead of the "ideal" frequency response 4 causes imperfect channel equalization and introduces additional inter-symbol interference into the equalized digital signal 157B fed to the DFE 107B. The DFE 107B then strives to remove the inter-symbol interference due both to cable distortion not compensated for by the equalizers 102, 106B and to distortion caused by the compensation gradient (offset slope) of the composite frequency response 6 of these two filters.

The maximum acceptable offset slope steepness (or minimum acceptable slope steepness of the frequency response 6) is reached when the total inter-symbol interference becomes irreparable even by a DFE. In the case of QAM, where the side lobes centered about the carrier frequency are symmetrical, excessive attenuation at higher frequencies can be partially compensated for by emphasizing the lower band. (This compensatory biasing effect occurs naturally in the DFE algorithm as it strives to make correct decisions based on the equalized digital signal 157B.)

It is to be understood that the offset introduced into the composite frequency response 6 of the analog equalizer 102 and the digital equalizers 106A,B need not resemble a linearly sloping characteristic. Instead, the offset, i.e., the difference between the ideal and inventive composite frequency responses, may have any characteristic that reduces the effect of crosstalk noise, which is especially dominant at higher frequencies, with the additional constraint that the resultant inter-symbol interference still be cancellable by the DFE. Nevertheless, it is preferable to employ some relatively simple shape for the offset.

While the preferred embodiment of the present invention has been described and illustrated, it will be apparent to one skilled in the art that numerous modifications and variations are possible. For example, analog-to-digital conversion may be executed at points other than at the input to the demodulator 105, such as prior to the VGA 103 or subsequent to demodulation. Moreover, passband filtering performed by the analog equalizer 102 may be omitted or, alternatively, baseband filtering executed by the digital equalizers 106A,B may be left out.

It is also possible to build on and improve the inventive receiver in FIG. 1 by adapting the equalizers 106A,B so as to track time-varying cable characteristics while continuing to provide a compensatory frequency response which reduces crosstalk noise. To this end, FIG. 2A shows a receiver 200 seen to comprise all of the components of the receiver 100 in FIG. 1 in addition to offset filters 208A,B and error calculation blocks 209A,B.

It is noted that the "A" and "B" phases are structurally identical. In the case of phase "B", now considered, the offset filter 208B applies a desired offset shape 10 to the equalized digital signal 157B, producing an offset filtered signal 261B. It is preferable that the shape of the frequency response 10 of the offset filter 208B be made to resemble, as much as possible, the spectral characteristic of the induced crosstalk noise, e.g., an upwards-sloping curve. Data stream 158B is also fed to the error calculation block 209B, which supplies a first error signal 263B to the digital equalizer 106B. A second error signal 231B is fed to the digital equalizer 106B directly from the DFE 107B.

The digital equalizer 106B then adapts its coefficients to minimize either the first error signal 263B or the second error signal 231B, resulting (upon convergence) in a composite frequency response 8 of the analog equalizer 102 and the digital equalizer 106B which has a shape that is offset from the "ideal" channel equalization response by the user-defined offset frequency response 10. A key advantage of this first alternate embodiment is that the amount of crosstalk noise can be controlled while allowing continuous adaptation of the composite frequency response to account for channel variations.

Figure 2A:
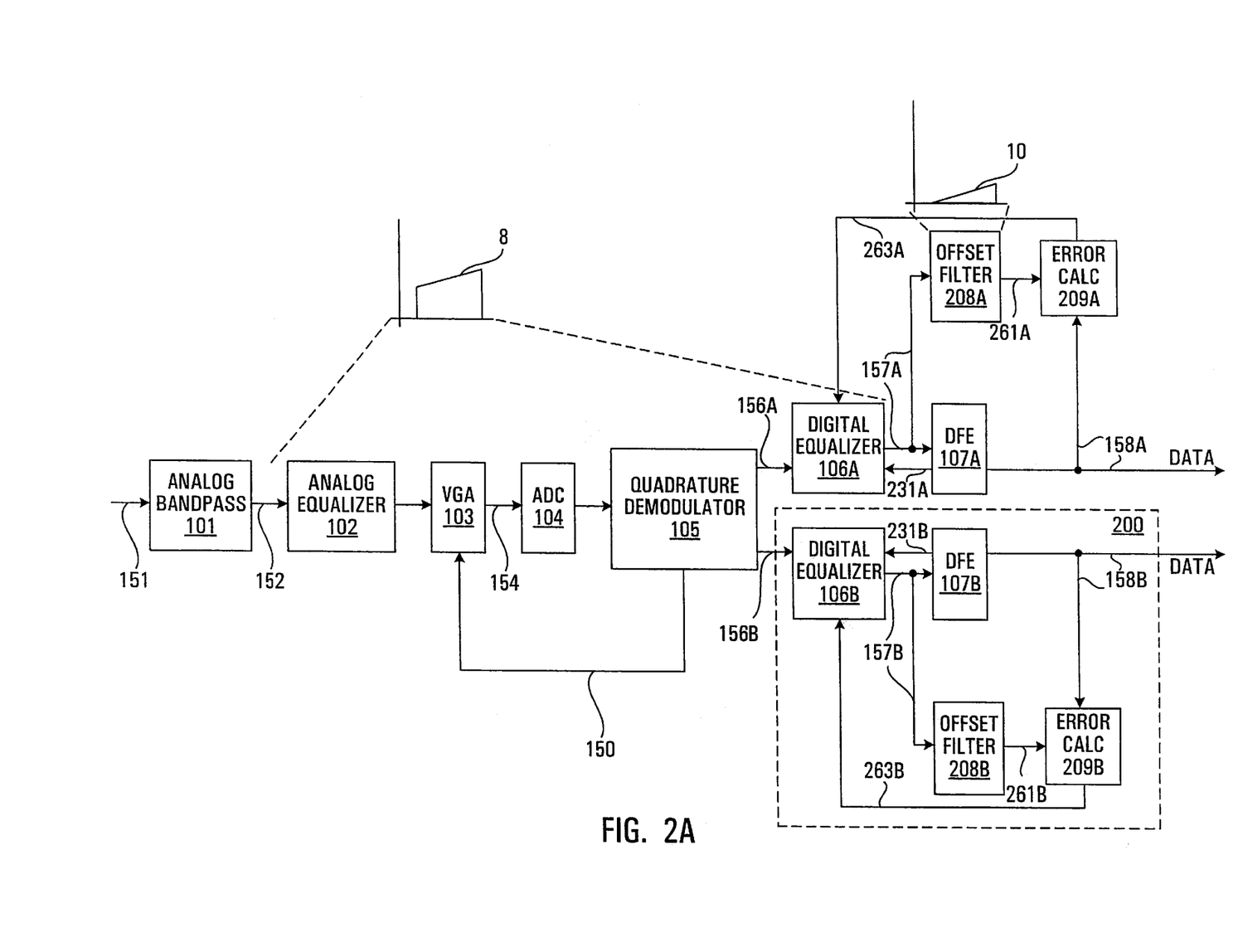
FIG. 2A is a high-level block diagram of a receiver in accordance with a first alternate embodiment of the present invention.
Figure 2B:
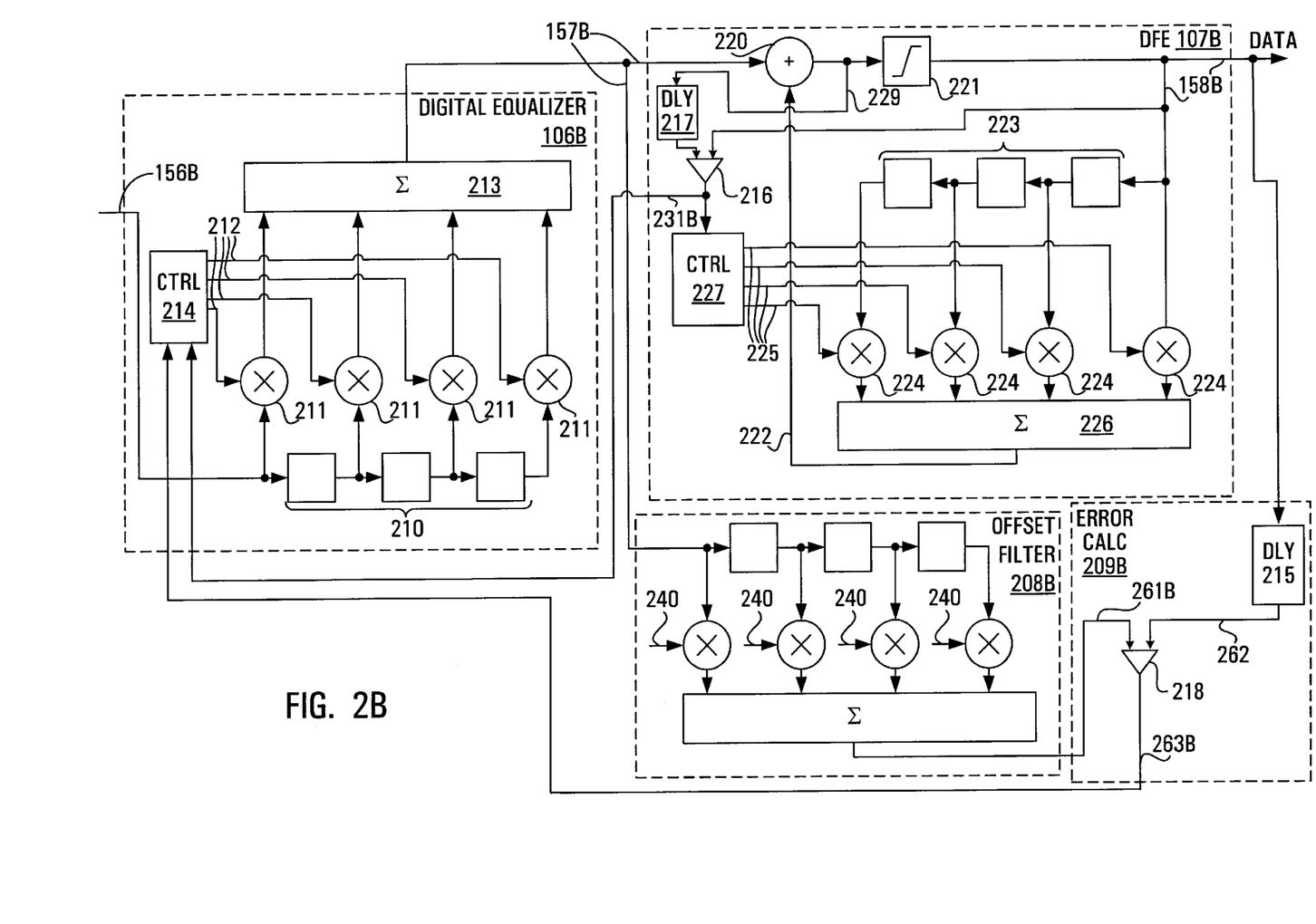
FIG. 2B is a detailed block diagram of part of the receiver in FIG. 2A.

In order to gain a more complete understanding of this embodiment, it is useful to describe in further detail the structure of the receiver in FIG. 2A, and particularly that of box 200 surrounding the digital equalizer 106B, the DFE 107B, the offset filter 208B and the error calculation block 209B, as expanded in FIG. 2B.

Structurally, the digital equalizer 106B is shown as an adaptive FIR filter with a tapped delay line 210, a series of multipliers 211 and respective coefficients 212, an adder 213 and a control block 214. The tapped delay line 210 consists of delay elements that retard the baseband digital signal 156B by one sample period each. At the output of each delay element, the resultant signal is tapped and enters a respective multiplier 211. While the tapped delay line 210 is shown as having only four taps in the interest of simplicity, it is most preferable to use anywhere from 24 to 32 taps, and a greater or smaller number may be used if desired.

At the control block 214, the values of the first and second error signals 263B and 231B are passed to a control algorithm which adjusts the values of the coefficients 212 multiplying the outputs of the delay elements. (Generation of the first and second error signals 263B and 231B is discussed below.) The adder 213 adds the delayed and scaled signal values, thereby producing the equalized digital signal 157B.

At the input end of the DFE 107B, the equalized digital signal 157B enters an adder 220 followed by a slicer 221. The adder 220 adds a feedback signal 222 to the equalized digital signal 157B producing a signal 229. The slicer 221 makes a data decision based on the value of the signal 229 output by the adder 220, resulting in data stream 158B. In this way, the equalized digital signal 157B is adjusted by the feedback signal 222 prior to the decision-making process.

The feedback signal 222 is an adaptively FIR-filtered version of the data stream 158B and, accordingly, the DFE 107B also comprises a tapped delay line 223 (accepting data stream 158B), a plurality of multipliers 224 and corresponding coefficients 225, an adder 226 and a control block 227 for adjusting the values of the multipliers 224. Again, the number of taps in the tapped delay line 223 preferably lies between 24 and 32, but can be greater or smaller if this leads to improved performance.

Still considering the DFE 107B, the output 229 of the adder 220 passes through a delay block 217 and subsequently enters a comparator 216. Also entering the comparator 216 is the output of the slicer 221, namely data stream 158B. The comparator 216 then measures a function (e.g., the absolute value or square) of the difference between the delayed samples and the decisions made by the slicer. The delay block 217 provides a time delay which compensates for the delay incurred by the slicer 221 in making a decision.

The output 231B of the comparator 216 is then fed to the control block 227 in the DFE 107B as well as to the control block 214 in the digital equalizer 106B. The control block 227 in the DFE 107B runs a conventional control algorithm to adjust the values of the coefficients 225 multiplying the outputs of the delay elements in the tapped delay line 223.

Considering now the offset filter 208B, it is shown in FIG. 2B as a simple FIR filter acting on the equalized digital signal 157B received from the digital equalizer 106B. The offset filter 208b could also be an IIR filter. In the style of an ordinary FIR filter, a plurality (preferably between 24 and 32) of coefficients 240 simultaneously multiply delayed versions of the equalized digital signal 157B, the products being added together to form the output signal 261B fed to the error calculation block 209B. In the embodiment of FIG. 2B, the values of the coefficients 240 of the offset filter 208B are kept fixed and provide an offset frequency response which resembles that of the crosstalk frequency characteristic, e.g., having an upward slope.

The output 261B of the offset filter 208B then enters a comparator 218 in the error calculation block 209B. The comparator 218 also accepts the output 262 of another delay block 215, which itself is fed by data stream 158B. The comparator measures the absolute value (or power, etc.) of the difference between signals 261B and 262 and feeds the resultant first error signal 263B back to the control block 214 of the digital equalizer 106B. For reasons to be discussed below, it is preferable that the delay applied by the delay block 215 be substantially identical to the delay introduced by the offset filter 208B minus the delay of the DFE 107B.

Operation of the inventive receiver depicted in FIGS. 2A and 2B is now considered, and can be broken down into three major steps. Again, in the interest of simplicity, only the "B" phase is considered, but it is to be understood that analogous treatment is applicable to the "A" phase.

(A) Startup

At startup, the coefficients 240 of the offset filter 208B are given values which provide an upward slope or any other shape approximating the crosstalk behaviour on the particular transmission medium in question. In this first alternate embodiment, these coefficients will remain fixed throughout receiver operation.

(B) Initial Adaptation

During initial adaptation, control block 227 in the DFE 107B adapts the DFE coefficients 225 based on the second error signal 231B from the comparator 216. (Internal adaptation of the DFE 107B is achieved using standard algorithms and need not be described in further detail.) While waiting for the DFE 107B to stabilize, control block 214 in the digital equalizer 106D is programmed to adapt the coefficients 212 based only on the first error signal 263B received from the error calculation block 209B. In this way, any transient error values of the error signal 231B output by the DFE 107B will not affect adaptation of the digital equalizer 107B.

When the coefficients 212 of the digital equalizer 106B are close to convergence, it will be apparent that the power (or energy or absolute value, etc.) of the first error signal 263B will be close to a minimum. It follows that the coefficients of the digital equalizer 106B will provide a frequency response which, in combination with the frequency responses of the offset filter 208B and analog equalizer 102B, closely tracks the inverse channel response. At the same time, the DFE 107B operates on samples which have reduced crosstalk, leading to better decisions, and hence a smaller value for the first error signal 263B, ending up in convergence of the coefficients 211.

The delay of delay block 215 is preferably equal to the delay of the offset filter 208B minus the delay of the DFE 107B. This permits the comparator 218 to deal with samples and with the data decisions corresponding to those samples.

(C) Steady-State Operation

Once the coefficients 212 of the digital equalizer 106B have reached a point beyond which further convergence is impossible, e.g., when the power of the first error signal 263B cannot be further reduced, then additional refinements can be obtained by the control block 214 switching to the second error signal 231B as output by the comparator 216 in the DFE 107B.

However, careful consideration of the block diagram in FIG. 2B reveals that if no attention is paid to the error signal 263B provided by the error calculation block 209B, the digital equalizer 106B will have a natural tendency to revert to "ideal" compensation of the channel frequency response, since the feedback loop will then involve only the DFE 107B, which is empowered with the capability to reduce ISI. In this case, when a new set of values for the coefficients 212 is reached, i.e., after a new settling time, the power of the second error signal 231B at convergence will actually increase, i.e., the data decisions made by the DFE will be less accurate than they were when consideration had been given to error signal 263B.

Therefore, it is important to program the control block 214 to weight the error signals 263B and 231B according to an appropriate ratio. The ideal value for this ratio will depend on many factors, such as the amount of crosstalk present and the degree to which the offset filter 208B correctly represents the crosstalk frequency characteristic.

In summary, the first alternate embodiment of the present invention just described achieves a substantial reduction in crosstalk noise at the expense of injecting a tolerable amount of inter-symbol interference at the input to the DFEs 107A, B. The desired amount of crosstalk noise attenuation as a function of frequency is modifiable via the coefficients 240 of the offset filter 208B. At the same time, variations in the channel are automatically tracked by the algorithms running in the control blocks 214, 227 of the digital equalizer 106B and DFE 107B, respectively.

Figure 3:
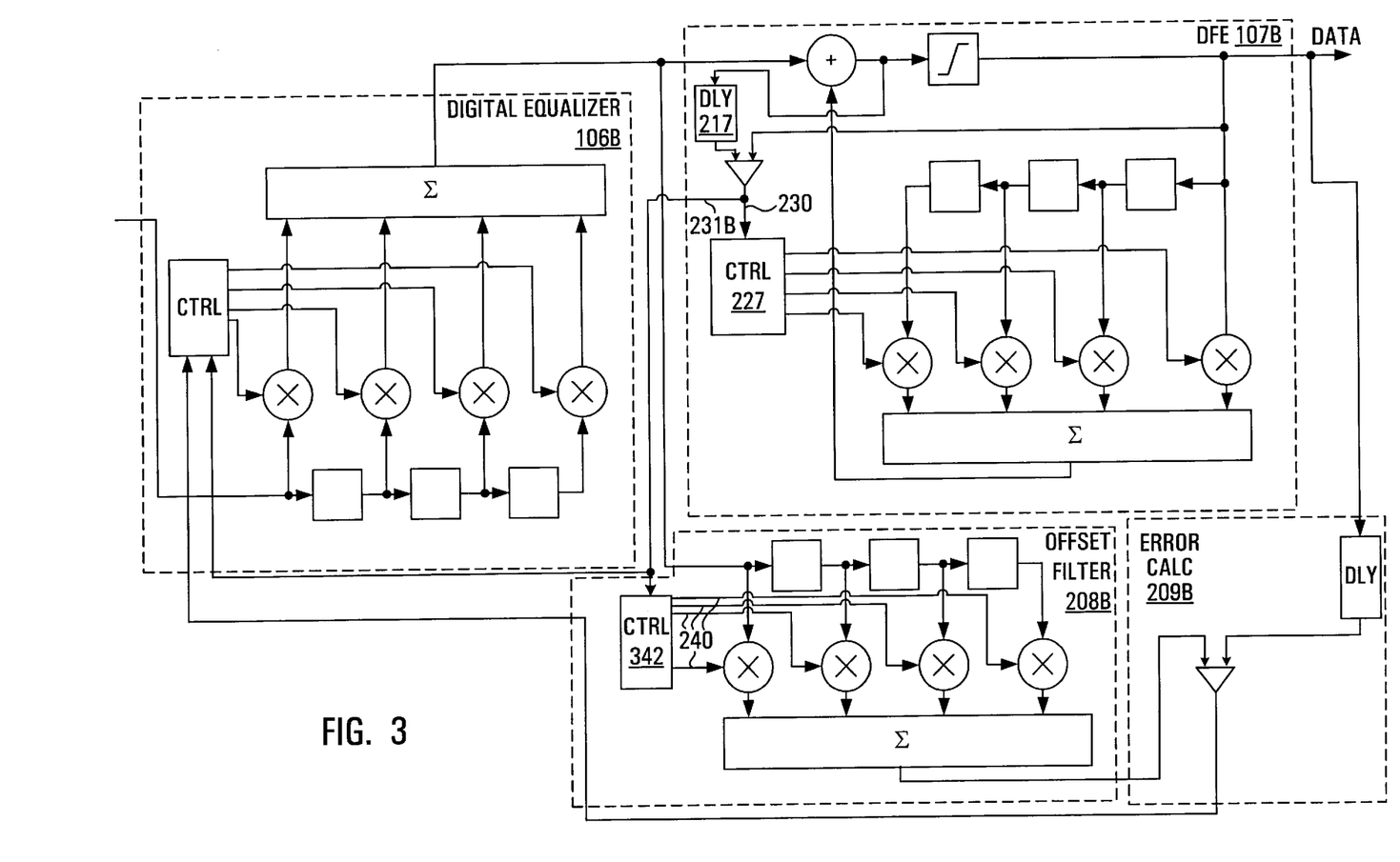
FIG. 3 is a detailed block diagram of part of a receiver in accordance with a second alternate embodiment of the present invention.

In yet another refinement of the present invention, the coefficients of the offset filter need not be fixed, but may be dynamically adjusted so as to exhibit continuously improving crosstalk cancellation behaviour. In FIG. 3, illustrating a second alternate embodiment of the present invention, the second error signal 231B output by the comparator 216 to the control block 227 in the DFE 107B is also fed to a control block 342 in the offset filter 208B for controlling the offset filter coefficients 240.

The embodiment of FIG. 3 will function similarly to that of FIGS. 2A and 2B, but will undergo an additional step, namely, adaptation of the coefficients 240 of the offset filter 208B based on the second error signal 231B supplied by the DFE 107B. Upon convergence of the offset filter coefficients 240, the frequency response of the offset filter 208B provides a more precise estimate of the crosstalk coupling characteristic, which was until this point held fixed to resemble a somewhat upwards-sloping curve.

While it is acceptable to allow the control block 342 to freely adapt at the offset filter coefficients 240, thereby leading to improved performance, it is still preferable to provide certain bounds within which the shape of the offset filter frequency response must fall. This is to avoid the scenario in which the offset filter coefficients adapt to a point beyond which the frequency response provided no longer resembles the crosstalk frequency characteristic.

Having regard now to the present invention in general, it is to be considered that, from a practical point of view, the digital filtering, summation and comparison operations may be performed by one or more digital signal processors or general purpose microprocessors. Furthermore, analog-to-digital conversion, while necessary at some point prior to decision feedback equalization, may be performed at any stage, for example, subsequent to demodulation or even at the outset, prior to bandpass filtering. In the latter case, any "analog" filtering or equalization operations would be replaced by digital ones.

Also, it is possible to envisage another embodiment of the present invention in which the analog equalizer is adapted in a manner similar to the way in which the coefficients of the digital equalizers are controlled in the first and second alternate embodiments. Of importance is only the combined frequency response of both equalizers, taking into account the operating band of each filter, i.e., passband for analog filtering and baseband for digital equalization. Alternatively, analog equalization may be omitted, or digital equalization may be omitted, in which case the feedback loop from the error calculation block 209B can be made to control modification of the parameters of the analog filter via a control block on a microprocessor.

In view of the above description of the preferred and alternate embodiments of the present invention and the numerous possible variations thereof, the scope of the invention is only to be limited by the claims appended hereto.

I claim:

1. An equalization system for equalizing an input signal corrupted by inter-symbol interference caused by channel distortion and crosstalk noise, the channel distortion and crosstalk noise having respective frequency characteristics, the equalization system comprising:

a linear equalizer for filtering the input signal and producing an intermediate signal having reduced crosstalk noise and reduced inter-symbol interference, wherein said linear equalizer has a frequency response made to resemble the difference between the inverse of the frequency characteristic of the channel distortion and the frequency characteristic of the crosstalk noise; and a decision-feedback equalizer connected to the linear equalizer, for filtering the intermediate signal and further reducing the inter-symbol interference contained therein.

2. An equalization system for producing an output data signal from an input signal corrupted by channel distortion and crosstalk noise, the crosstalk noise having a frequency characteristic, the channel distortion causing inter-symbol interference, the equalization system comprising:

an adaptive linear equalizer for filtering the input signal and producing an intermediate signal having reduced crosstalk noise and reduced inter-symbol interference, wherein the adaptive linear equalizer has a frequency response controllable by a first error signal;

a decision-feedback equalizer connected to the adaptive linear equalizer, for filtering the intermediate signal and further reducing the inter-symbol interference contained therein, thereby to produce the output data signal;

an offset filter connected to the adaptive linear equalizer, for filtering the intermediate signal in accordance with a selectable offset frequency response and producing an offset-filtered signal, wherein the offset frequency response is selected to resemble the crosstalk frequency characteristic; and an error calculation block connected to the decision-feedback equalizer, to the offset filter and to the adaptive linear equalizer, for measuring a characteristic of the difference between the offset-filtered signal and a delayed version of the output data signal, thereby to produce the first error signal.

3. An equalization system according to claim 2, wherein the offset frequency response has an upwards-sloping curve.

4. An equalization system in accordance with claim 2, wherein the decision-feedback equalizer comprises means for evaluating a function of the difference between the output data signal and a delayed version of a signal formed by adding the intermediate signal to a filtered version of the output data signal, thereby to form a second error signal, wherein the frequency response of the adaptive linear equalizer is further controllable by the second error signal.

5. An equalization system according to claim 4, wherein the offset filter is adaptive and wherein the offset frequency response is controllable by the second error signal.

6. An equalization system according to claim 2, wherein the offset filter is a finite-impulse-response filter.

7. An equalization system according to claim 2, wherein the offset filter is a infinite-impulse-response filter.

8. An equalization system in accordance with claim 2, wherein the decision-feedback equalizer comprises means for evaluating a function of the difference between the output data signal and a delayed version of a signal formed by adding the intermediate signal to a filtered version of the output data signal, thereby to form a second error signal, wherein the offset filter is adaptive and wherein the offset frequency response is controllable by the second error signal.

9. In a method of equalizing an input signal corrupted by inter-symbol interference caused by cable loss varying in the frequency domain, said method consisting of filtering the input signal with a linear equalizer having a frequency response which compensates for the inter-symbol interference, the improvement wherein the frequency response of the linear equalizer is deliberately made different from the frequency response which fully compensates for the inter-symbol interference so as to compensate for crosstalk, the remaining inter-symbol interference being further reduced by filtering with a decision-feedback equalizer.

10. A receiver used for producing a plurality of streams of digital data from a received analog input signal containing an analog message signal carrying the digital data, the message signal being centered about a carrier frequency and corrupted by channel distortion and crosstalk noise having respective frequency characteristics, the channel distortion causing inter-symbol interference, the receiver comprising:

a bandpass filter for receiving the analog input signal and extracting the analog message signal therefrom;

an analog-to-digital converter connected to the bandpass filter for converting the analog message signal to an intermediate digital signal;

a demodulator connected to the analog-to-digital converter for creating a plurality of digital output signals from the intermediate digital signal;

at least one decision-feedback equalizer connected to the demodulator for filtering the digital output signals and creating the digital data streams therefrom; and an adaptive equalization means placed at one or more points between the bandpass filter and the at least one decision-feedback equalizer, the adaptive equalization means having a selectable overall frequency response;

wherein the overall frequency response of the adaptive equalization means is selected to resemble a difference between the inverse of the frequency characteristic of the channel distortion and the frequency characteristic of the crosstalk noise.

11. A receiver according to claim 10, wherein the bandpass filter has a frequency range of 1 MHz to 30 MHz.

12. A receiver according to claim 10, wherein the demodulator is a QAM demodulator.

13. A receiver according to claim 10, further comprising a variable-gain amplifier placed at one point between the bandpass filter and the analog-to-digital converter.

14. A receiver according to claim 10, further comprising an offset filter connected to the adaptive equalization means for filtering the intermediate digital signal in accordance with a selectable offset frequency response and producing an offset-filtered signal.

15. A receiver according to claim 14, wherein the offset frequency response has an upwards-sloping curve.

16. A receiver in accordance with claim 14, wherein only one of the at least one decision-feedback equalizer comprises means for evaluating a function of the difference between the output data signal and a delayed version of a signal formed by adding the intermediate signal to a filtered version of the output data signal, thereby to form a second error signal, wherein the frequency response of the adaptive equalization means is further controllable by the second error signal.

17. A receiver according to claim 16, wherein the receiver has an initial mode of operation, during which adaptation of the adaptive equalization means is controlled by a first error signal, and a steady-state mode of operation, during which adaptation of the adaptive equalization means is controlled partly by the first error signal and partly by the second error signal.

18. A receiver according to claim 16, wherein the offset filter is adaptive and wherein the offset frequency response is controllable by the second error signal.

19. A receiver according to claim 14, wherein the offset filter us a finite-impulse-response filter.

20. A receiver according to claim 14, wherein only one of the at least one decision-feedback equalizers comprises means for evaluating a function of the difference between the output data signal and a delayed version of a signal formed by adding the intermediate signal to a filtered version of the output data signal, thereby to form a second error signal, wherein the offset filter is adaptive and wherein the offset frequency response is controllable by the second error signal.

* * * * *